(12) United States Patent
Hoteit et al.

(10) Patent No.: US 6,868,920 B2
(45) Date of Patent: Mar. 22, 2005

(54) METHODS AND SYSTEMS FOR AVERTING OR MITIGATING UNDESIRABLE DRILLING EVENTS

(75) Inventors: Leila Hoteit, Montigny-sur-Loing (FR); Jonathan Dunlop, Cambridge (GB); Walt Aldred, Thriplow (GB); Richard Meehan, Sugar Land, TX (US)

(73) Assignee: Schlumberger Technology Corporation, Ridgefield, CT (US)

( * ) Notice: Subject to any disclaimer, the term of this patent is extended or adjusted under 35 U.S.C. 154(b) by 109 days.

(21) Appl. No.: 10/334,437

(22) Filed: Dec. 31, 2002

(65) Prior Publication Data

US 2004/0124009 A1 Jul. 1, 2004

(51) Int. Cl.[7] .............................................. E21B 19/08
(52) U.S. Cl. .............................. 175/25; 175/38; 175/48
(58) Field of Search ............................ 175/24, 25, 26, 175/27, 38, 40, 48

(56) References Cited

U.S. PATENT DOCUMENTS

| | | | |
|---|---|---|---|
| 3,605,919 A | | 9/1971 | Bromell et al. |
| 4,549,431 A | * | 10/1985 | Soeiinah .................. 73/152.49 |
| 4,553,429 A | * | 11/1985 | Evans et al. ............. 73/152.21 |
| 4,606,415 A | | 8/1986 | Gray, Jr. et al. |
| 4,685,329 A | | 8/1987 | Burgess |
| 4,793,421 A | * | 12/1988 | Jasinski ....................... 175/27 |
| 5,465,798 A | * | 11/1995 | Edlund et al. ................ 175/24 |
| 5,952,569 A | | 9/1999 | Jervis et al. |
| 6,021,377 A | | 2/2000 | Dubinsky et al. |
| 6,233,524 B1 | | 5/2001 | Harrell et al. |
| 6,438,495 B1 | | 8/2002 | Chau et al. |
| 2002/0112888 A1 | * | 8/2002 | Leuchtenberg ................ 175/48 |
| 2003/0015351 A1 | * | 1/2003 | Goldman et al. .............. 175/39 |
| 2003/0220742 A1 | * | 11/2003 | Niedermayr et al. ........... 702/9 |
| 2004/0040746 A1 | * | 3/2004 | Niedermayr et al. .......... 175/38 |

FOREIGN PATENT DOCUMENTS

| | | |
|---|---|---|
| EP | 0 939 195 A2 | 9/1999 |
| GB | 2 341 685 A | 7/1999 |
| GB | 2 376 769 A | 12/2002 |
| WO | 01/25823 A1 | 9/2000 |

OTHER PUBLICATIONS

Aldred et al Managing drilling risk Oilfield Review, Summer 1999, pp. 2–19.

(List continued on next page.)

*Primary Examiner*—William Neuder
(74) *Attorney, Agent, or Firm*—William L. Wan; Tim W. Curington; William B. Batzer

(57) ABSTRACT

A method and system for averting or mitigating undesirable drilling events during a drilling process is disclosed. The state of the drilling rig is detected, preferably automatically, based on surface and/or downhole measurement data. One or more undesirable drilling events are detected by correlating the acquired measurement data with the detected state. A drilling rig action is determined which averts or mitigates a detected undesirable drilling event. Finally, the drilling process is overridden by commanding performance of the action.

The algorithm used in detecting the most likely rig state is preferably probabilistic in nature, and is even more preferably based on particle filtering techniques.

10 Claims, 10 Drawing Sheets

OTHER PUBLICATIONS

Bourgois et al The MDS system: Computers transform drilling Oilfield Review, vol. 2, No. 1, 1990.

Burgess et al Measuring the wear of milled tooth bits using MWD torque and weight–on–bit SPE/IADC 13475, 1985.

Carpenter et al Building robust simulation–based filters for evolving data sets Technical report, Department of Statistics, University of Oxford, 1998.

Chevallier et al MDS system increases drilling safety and efficiency Petroleum Engineer International, No. 9, 1989, pp. 16–24.

Fearnhead Sequential Monte Carlo methods in filter theory Department of Statistics, University of Oxford, 1998, p. 88.

Fearnhead Sequential Monte Carlo methods in filter theory Department of Statistics, University of Oxford, 1998, pp. 92–94.

Hargreaves et al Early kick detection for deepwater drilling: new probabilistic methods applied in the field SPE 71369, 2001.

Kennedy et al Statistical Computing Marcel Dekker, New York, 1980, chapter 6, pp. 133–264.

Varco Company—Instrumentation Varco's Integrated Control and Information System Pre Dec. 2002.

Varco systems—Drill Rig Equipment Electronic driller features Pre Dec. 2002.

Washout Alarm Schlumberger Drilling and Measurement overview flier Pre Dec. 2002.

* cited by examiner

METHODS AND SYSTEMS FOR AVERTING OR MITIGATING UNDESIRABLE DRILLING EVENTS

FIELD OF THE INVENTION

The invention relates to methods and systems for averting or mitigating undesirable drilling events.

BACKGROUND OF THE INVENTION

In oilfield applications, the drilling process can be impeded by a wide variety of problems. Accurate measurements of downhole conditions, rock properties and surface equipment allow many drilling risks to be minimized, but they are also crucial for detecting that a problem has occurred. At present, most problem detection is the result of human vigilance, but detection probability is often degraded by fatigue, high workload or lack of experience.

Some limited techniques have been used for detecting one of two possible rig states, but generally these have only used a single input channel. In one example, a technique is used to automatically detect if the drill pipe is "in slips" or "not in slips". This information is used in gaining accurate control of depth estimates, for example in conjunction with activities such as measurement-while-drilling (MWD or mud logging. To tell whether the drill pipe is "in slips" the known technique generally only uses a single input channel measured on the surface: Hookload. Another example is a technique used to predict if the drill bit is "on bottom" or "not on bottom." Similarly, this method makes use of only a single input channel, namely block position, and is only used to detect one of two "states" of the drilling rig.

Known event detection systems have depended upon the drilling personnel to identify the rig state. For example see, "The *MDS System: Computers Transform Drilling*", Bourgois, Burgess, Rike, Unsworth, Oilfield Review Vol. 2, No. 1, 1990, pp.4–15, and "*Managing Drilling Risk*" Aldred et al., Oilfield Review, Summer 1999, pp. 219.

SUMMARY OF THE INVENTION

An object of the present invention is to provide methods and systems that can avert or mitigate undesirable drilling events during a drilling process.

In general terms, the present invention provides methods and systems for automatic control of drilling processes.

A first aspect of the invention provides an automated (e.g. computerised) method of averting or mitigating undesirable drilling events during a drilling process, the method comprising:

detecting the state of the drilling rig performing the drilling process, acquiring surface and/or downhole measurement data, detecting one or more undesirable drilling events by correlating the acquired measurement data with the detected state, determining a drilling rig action which averts or mitigates a detected undesirable drilling event, and overriding the drilling process by commanding performance of the action.

Detection of the drilling rig state may be performed using conventional rig state detection approaches. However, preferably the detection comprises the steps of:

receiving two or more independent input data channels, each input data channel representing a series of measurements made over time during the drilling process, and based on the two or more input data channels, detecting the most likely current state of the drilling rig from at least three possible rig states.

The rig state detection preferably makes use of three or more independent input channels which are preferably selected from the following: hookload, block position, torque and stand pipe pressure. The set of possible rig states preferably includes at least four or six states, and even more preferably, more than ten possible states. The rig state detection also preferably generates a probability of each possible rig state.

The algorithm used in detecting the most likely rig state is preferably probabilistic in nature, and is even more preferably based on particle filtering techniques.

In one embodiment the method further comprises the step of acquiring earth model data, the acquired measurement data being further correlated with the earth model data in order to detect the undesirable drilling events.

The step of detecting one or more drilling events may involve comparing values derived from the surface and/or downhole measurement data with threshold values, different threshold values being used depending upon the detected drilling rig state.

Another aspect of the invention provides a system (e.g. a computerised system) for automatically averting or mitigating undesirable drilling events during a drilling process, the system comprising:

a detection system for detecting the state of the drilling rig performing the drilling process, an acquisition system for acquiring surface and/or downhole measurement data, a processor for (i) detecting one or more undesirable drilling events by correlating the acquired measurement data with the detected state, and (ii) determining a drilling rig action which averts or mitigates a detected undesirable drilling event, and a command issue device for overriding the drilling process by issuing a command requiring performance of the action.

Further aspects of the invention provide computer systems and computer programs for performing the method of the first aspect, and computer readable media carrying such programs.

As used herein, the terms "rig states" and "states of the rig" refer to intentional actions taking place in a drilling system during the drilling process. The set of rig states are preferably defined such that they are mutually exclusive.

As used herein the term "drilling process" refers to the entire phase of wellbore construction relating to drilling the wellbore, including the operations commonly known as tripping, reaming, rotary drilling, slide drilling and running casing.

DETAILED DESCRIPTION

Figure 1:
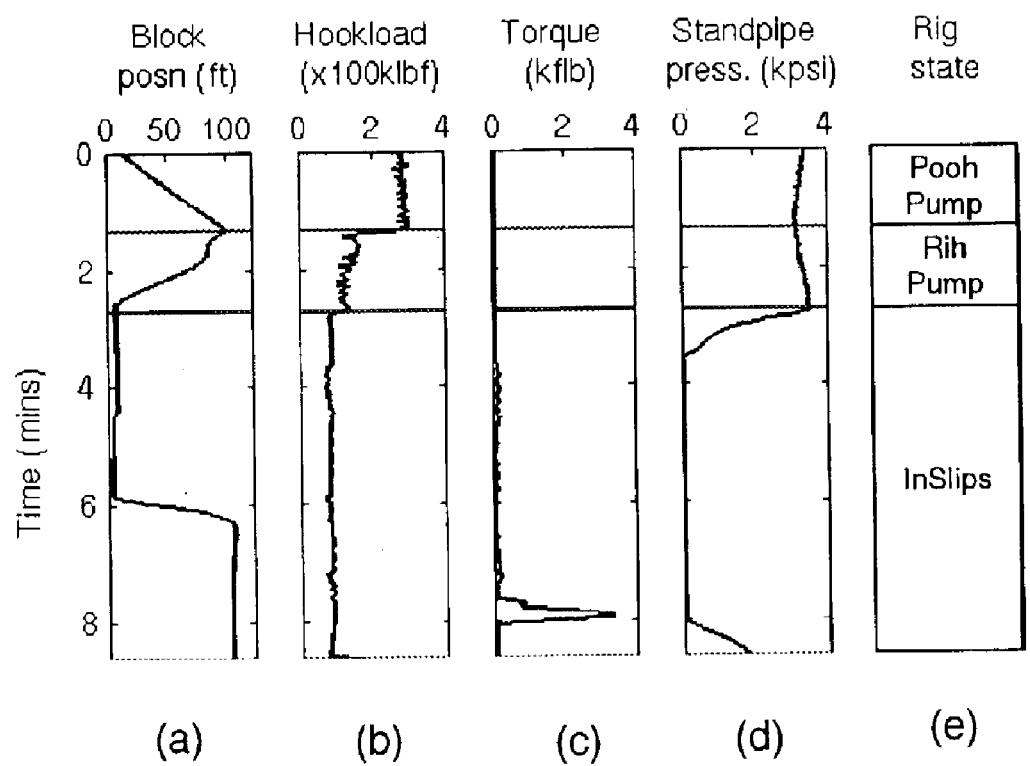
FIG. 1 shows an example of the inputs and output of a system for rig state detection.

The present invention is at least partly based on the realisation that by providing reliable rig state detection and event detection, it becomes possible to provide automatic control of drilling processes. One embodiment provides an automatic override system which detects when an undesirable drilling event is occurring or is likely to occur and then controls rig operation to avert or mitigate the event. That is, rather than merely raising an alarm and suggesting corrective action, the system actively takes charge of rig operation to safeguard the rig and/or the well.

The rig state and event detection processes may be based on conventional approaches discussed above. However, preferably the present invention makes use of automatic rig state and event detection techniques described in detail below.

The overridden drilling process may be a manually-controlled process. In this case, when the corrective action has been performed, control of the rig can be handed back to the rig personnel.

However a more elaborate embodiment provides a system which overrides an operation that is itself automated. For example, automated rig equipment may be programmed to complete a predetermined drilling operation, such as maintaining a constant weight-on-bit or surface torque during drilling. As the operation proceeds and the automatic override system detects impending undesirable drilling events, it may modify the performance of the operation to avert or mitigate the events. An example of automated rig equipment that could be modified to accept an automatic override system is Varco's Electronic Driller (see http://www.varco.com/products/VDE/c2orange/css/c2orange_6.htm).

We now describe in detail automatic rig state and event detection before going on to describe drilling process override systems which include these capabilities.

Automatic Rig State and Event Detection

We have recognized that the signatures that may lead to the accurate detection of many drilling events are spread across multiple surface and downhole channels with low signal-to-noise ratios. Additionally, many of the routine actions of the driller could be mistaken for problems unless the system is analysed as a whole. We have found that by automatically detecting the drilling rig activity or 'rig state' in real-time, this rig state information can be fed into problem detection algorithms thereby greatly increasing the accuracy of such algorithms.

The following notation is used in this part of the description:

| | |
|---|---|
| BHA | Bottom hole assembly |
| BPOS | Block position |
| BVEL | Block velocity |
| DEPT | Bit depth |
| HKLD | Hookload |
| HMM | Hidden Markov model |
| IDEAL ™ | Integrated Drilling Evaluation and Logging |
| LWD | Logging while drilling |
| MWD | Measurement while drilling |
| POOH | Pull out of hole |
| PPF | Parametric particle filter |
| RIH | Run in hole |
| RPM | Revolutions per minute |
| SPIN-DR | Stuck Pipe Investigation, Diagnosis and Recommendation - SPIN Doctor ™ |
| SPPA | Standpipe pressure |
| TQA | Torque |

FIG. 1 shows an example of the inputs and output of a system for rig state detection. Rig activity can be broken down into a number of processes, such as drilling in rotary mode, drilling in slide mode, RIH, POOH etc., that are controlled by the driller. As shown in the columns (a) to (d) in FIG. 1, the preferred input channels are measurements made at the surface on the rig, namely block position (a), Hookload (b), torque (c) and standpipe pressure (d). Based on these four input channels, the rig state detection system detects the state of the drilling rig, shown in column (e). In this example the system has detected states "PoohPump", "RihPump" and "in slips" which will be described in further detail below.

It has been found that the following 13 rig states provide a suitable basis for providing rig event detection and control in many applications:

| State | Rotation | Pumping | Block movement | Hookload |
|---|---|---|---|---|
| DrillRot | ✓ | ✓ | ↓ | Low |
| DrillSlide | x | ✓ | ↓ | Low |
| RihPumpRot | ✓ | ✓ | ↓ | Low |
| RihPump | x | ✓ | ↓ | Low |
| Rih | x | x | ↓ | Low |
| PoohPumpRot | ✓ | ✓ | ↑ | High |
| PoohPump | x | ✓ | ↑ | High |
| Pooh | x | x | ↑ | High |
| StaticPumpRot | ✓ | ✓ | x | ~T |
| StaticPump | x | ✓ | x | ~T |
| Static | x | x | x | ~T |
| In slips | x | Either | ↓ | ~B |
| Unclassified | Either | Either | Any | Any | where B = weight of the traveling block and T = weight of drill string.

Preferably, a reasonable density is provided for each state-channel combination and a transition probability is assigned for each state-to-state transition. Unlikely transitions such as 'Pooh' then 'InSlips' are assigned a low probability, as the pipe must be moving downwards for the pipe to go into slips. Consequently, 'Rih' then 'InSlips' should receive a high probability.

An 'unclassified' state is included with extremely conservative densities to capture less likely operations, such as rotating but not pumping. However, according to the particular application at hand, it may be useful to define further states. For example, it has been found that in some cases three additional states are useful to define the case of rotating without pumping: RihRot, PoohRot, StaticRot.

Since the surface measured input channels are typically corrupted by noise, the system for detecting rig state makes use of Bayesian inference, in that it preferably operates by representing degrees of belief in opposing hypotheses. These hypotheses incorporate the extensive prior information that is known about each state (e.g. hookload drops to the weight of the travelling block whilst the pipe is in slips) and which state is likely or unlikely to follow another.

According to a preferred embodiment, the basic rig states feed into a hierarchy of more complex rig states. An 'in slips' state where the block position ends up approximately 90 ft higher than when it entered the state could be relabeled 'Connection (pipe added)'. The sequence 'RIH', 'Connection (pipe added)', 'RIH', 'Connection (pipe added)', etc. could be classified as 'Tripping in'.

Most of the known multiple changepoint problems in the general signal processing literature are applied to the data retrospectively, but the computation involved usually precludes their application to on-line detection. For example, U.S. Pat. No. 5,952,569, discloses the application of single changepoint models that are computationally inexpensive by comparison, so this is both retrospective and on-line. Sequential methods modify the result from the previous time step, rather than recompute from scratch, so more sophisticated models can be applied within the sampling period. Preferably, the sequential Bayesian technique known as particle filtering is used in rig state detection using a parametric particle filter.

Sequential Bayesian Filtering will now be described in further detail. A noisy measurement $x_t$ is represented as a function of an underlying system variable $\theta_t$ and an observation noise term $v_t$ in the observation model $$x_t = h_t(\theta_t, v_t). \tag{1}$$

The system model $$\theta_{t+1} = f_t(\theta_t, w_t) \tag{2}$$

captures the dynamics of the system. The current value of the system variable, $\theta_{t+1}$, is assumed to be dependent on the previous value, $\theta_t$, but independent of the value at all other times, $\theta_{t-1}, \theta_{t-2}, \ldots, \theta_0$; such a process is called Markov. Events that influence the system dynamics but are not captured by the Markov process are represented as another noise process called system noise $w_t$.

As an example, $\theta_t$ is a vector containing the range and speed of an aircraft flying directly away from an airport. The system model $$\begin{pmatrix} r_{t+1} \\ \dot{r}_{t+1} \end{pmatrix} = \begin{pmatrix} 1 & \Delta t \\ 0 & 1 \end{pmatrix} \begin{pmatrix} r_t \\ \dot{r}_t \end{pmatrix} + \begin{pmatrix} 0 \\ w_t \end{pmatrix} \tag{3}$$

models range as increasing by the product of speed and sampling time $\Delta t$. $w_t$ is a Gaussian that models changes in speed due to gusts of wind or the pilot changing thrust. $x_t$ is the range given by the airport's radar that is corrupted by Gaussian observation noise (combined effects of electrical noise in the amplifiers, finite range resolution of the radar, etc)

$$x_t = (1 \quad 0) \begin{pmatrix} r_t \\ \dot{r}_t \end{pmatrix} + v_t. \tag{4}$$

According to a preferred embodiment, the rig state detection system employs a specific type of particle filter called the parametric particle filter.

Parametric particle filter (PPF) as used herein describes a particle filter where the system model or the observation model is controlled by a hidden Markov model, as defined in Carpenter J, Clifford P and Fearnhead P, "Building Robust Simulation-based Filters for Evolving Data Sets", Technical report, Department of Statistics, University of Oxford, 1998.

A hidden Markov model (HMM) is a probabilistic process over a discrete set of states $\gamma = \{1, \ldots, K\}$. The likelihood of the state at the next time step is given by a square matrix of transition probabilities $P(\gamma_{t+1}|\gamma_t)$ that can capture likely and unlikely sequences of states.

Figure 2:
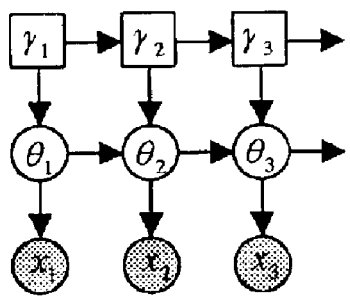
FIG. 2 illustrates a parametric particle filter viewed as a Bayesian network.

FIG. 2 illustrates a parametric particle filter viewed as a Bayesian network. In the Bayesian network representation of the parametric particle filter, the arrows indicate the direction of causal impact.

Each particle must consider the possibility of state transition at each step, so the particle is split into K new particles with weights $$\tilde{m}_{t+1}^{i,j} \propto m_t^i p(x_{t+1}|\gamma_{t+1}=j, \alpha_t^i) P(\gamma_{t+1}=j|\gamma_t^i). \tag{5}$$

for $j=1, \ldots, K$. A resampling step is used to reduce to number of particles from nK back to n, to avoid an exponentially increasing number of particles with time.

The resampling step and the Kalman filter are now discussed in further detail.

The minimum variance sampling algorithm chooses a new set of weights $X^{i,j}$ that minimises $$E\left(\sum_{j=1}^{K} \sum_{i=1}^{n} (\tilde{m}_{t+1}^{i,j} - X^{i,j})^2\right) \tag{6}$$

subject to the constraints $E(X^{i,j}) = \tilde{m}_{t+1}^{i,j}$ and that at most n of the $X^{i,j}$ are non-zero. The weights that will propagate to the next time step $(m_{t+1}^i)_{i=1, \ldots, n}$ will consist of the non-zero $X^{i,j}$. The resulting algorithm is as follows:

1. Calculate c, the unique solution to $$n = \sum_{j=1}^{K} \sum_{i=1}^{n} \min(c\tilde{m}_{t+1}^{i,j}, 1).$$

This can be solved iteratively. See, "Sequential Monte Carlo methods in filter theory", P. Fearnhead, Department of Statistics, Oxford University, 1998 p.92.

2. Particles where $c\tilde{m}_{t+1}^{i,j} > 1$ are retained with unchanged weights $X^{i,j} = \tilde{m}_{t+1}^{i,j}$. The number of retained particles is k.

3. n−k particles are sampled from the remaining nK−k particles using the systematic sampling algorithm (See, Carpenter, 1998, p.8). Note that the published algorithm contains a typographical error; the fourth line from the end should read 'switch $s^k$ with $s^j$'. The sampled particles receive weight $X^{i,j} = 1/c$ and the remainder are set to zero.

4. Normalise $X^{i,j}$ to sum to unity.

5. Set $(m_{t+1}^i)_{i=1, \ldots, n}$ to the non-zero $X^{i,j}$.

The likelihood of a particular state at any time can be estimated by the sum of the weights of the particles in that state (see, Fearnhead, 1998, p.88).

$$\hat{P}(\gamma_{t+1} = j \mid x_{t+1}) = \sum_{i=1}^{n} m_{t+1}^{i} \delta(\gamma_{t+1}^{j} - j). \quad (7)$$

If the state of the system is unchanged, it is assumed that the following observation and system models apply, $$\theta_t = F\theta_{t-1} + W_t$$

$$x_t = H\theta_t + V_t \quad (8)$$

The noise random variables $W_t$ and $V_t$ are multivariate Gaussian random variables with zero mean and covariance matrices Q and R. $W_t$ and $V_t$ are uncorrelated. If the prior is also Gaussian, at each time step, both the prior and posterior will be Gaussian. The solution to these conditions is the well-known Kalman filter.

The prior at time t, $p(\theta_t|x_{t-1})$, has mean $a_{t|t-1}$ and covariance $P_{t|t-1}$.

The posterior at time t, $p(\theta_t|x_t)$, has mean $a_t$ and covariance $P_t$.

The Kalman filter equations are:

$$a_{t|t-1} = Fa_{t-1}, \quad (9)$$

$$P_{t|t-1} = FP_{t-1}F^T + Q, \quad (10)$$

$$a_t = a_{t|t-1} + P_{t|t-1} K_t^{-1}(x_t - a_{t|t-1}), \quad (11)$$

$$P_t = P_{t|t-1} - P_{t|t-1} K_t^{-1} P_{t|t-1}. \quad (12)$$

K, the Kalman gain matrix, is given by $$K_t = P_{t|t-1} + R. \quad (13)$$

Figure 3:
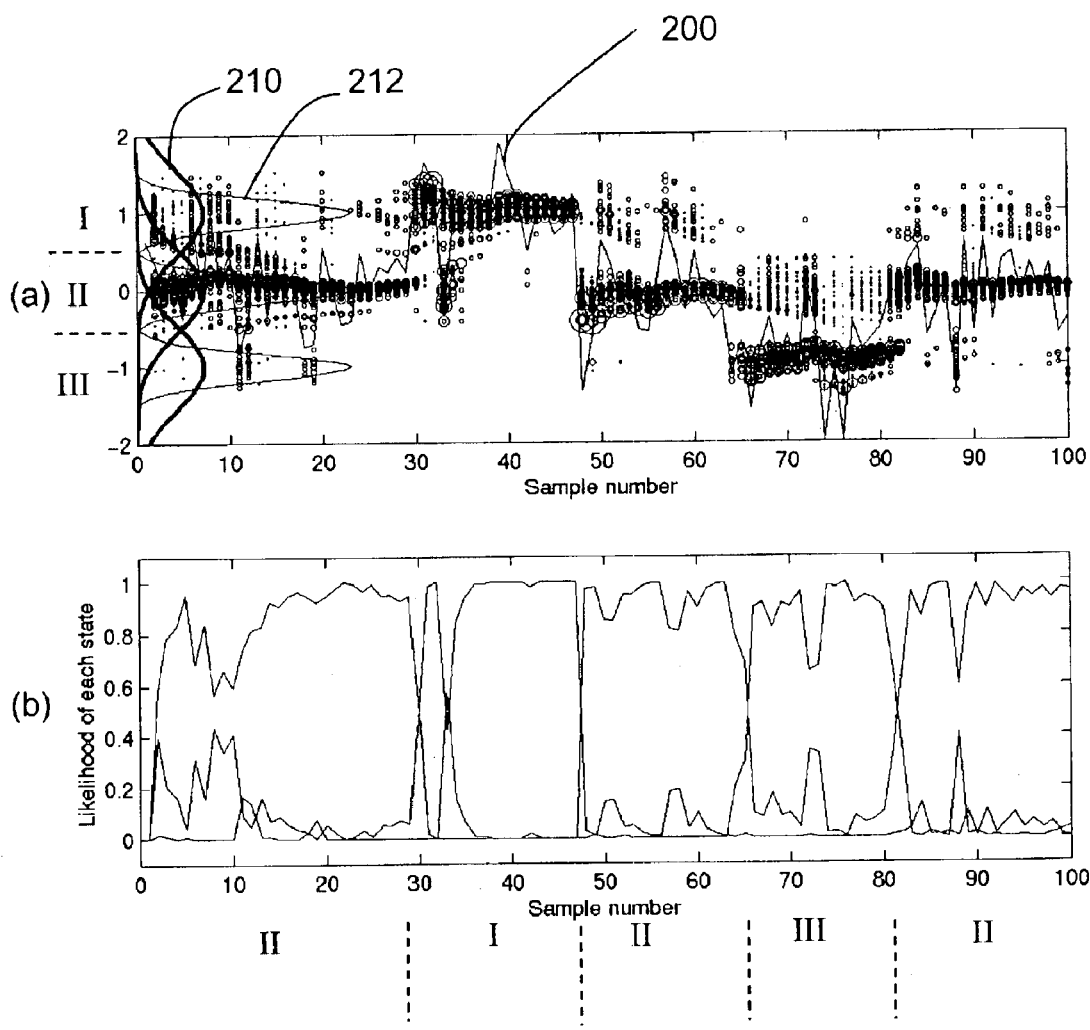
FIG. 3 shows simulated data where each sample was drawn from one of three noisy states.

A simple example of a parametric particle filter will now be described. FIG. 3 shows simulated data where each sample was drawn from one of three noisy states. In particular FIG. 3 shows an example of a parametric particle filter applied to simulated data drawn from the bold Gaussians 210 on the left side plot (a). The narrow Gaussians 212 indicate the prior knowledge of the state locations. In this example, there is a single input channel denoted by line 200, and the three state are denoted with roman numerals I, II, and III. The centre of each circle indicates a particle, its radius indicates the particle weight and the particle state is indicated by the roman numerals I, II and III. 100 particles were used.

In plot (b) a PPF was used to estimate which state the data was drawn from. The numerals I, II and III indicate the most likely state for each sample. Each particle contained an independent Kalman filter for each state. The filter corresponding to the particle's current state was updated sequentially, but the other two filters remained dormant.

Figure 4:
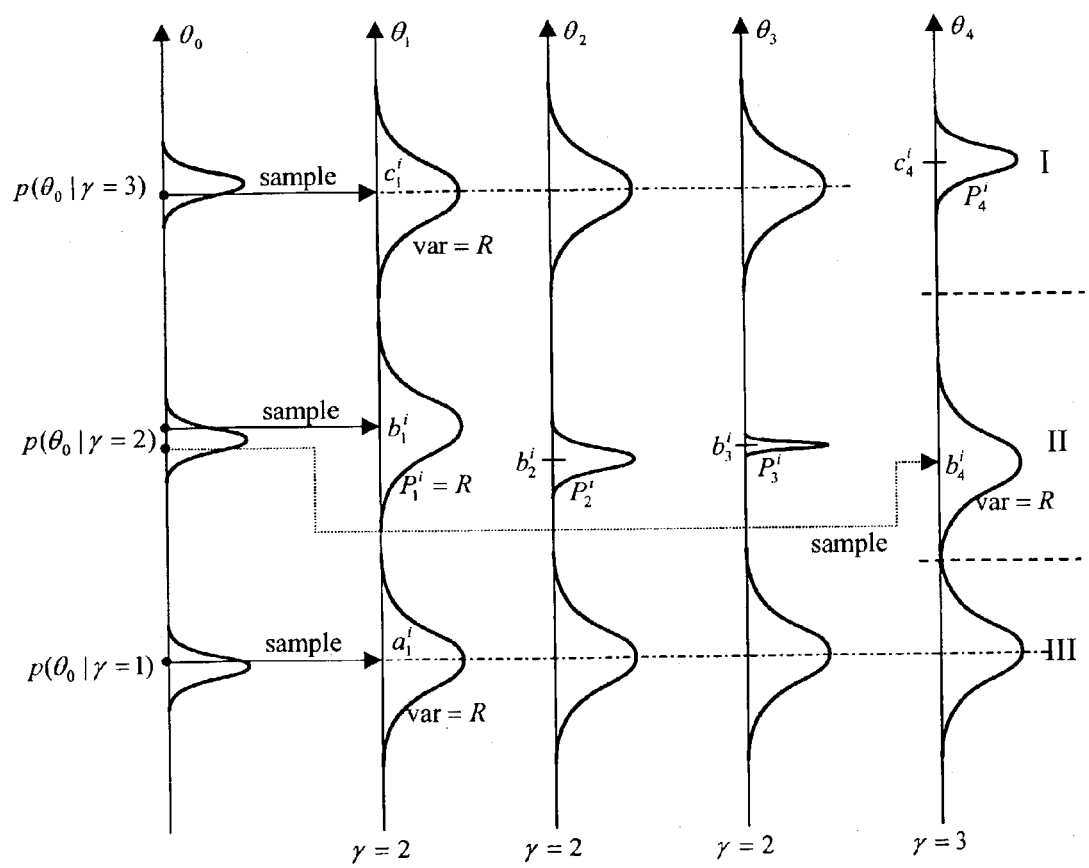
FIG. 4 shows changes in the posterior densities of one particle during four time steps from the example shown in FIG. 3.

FIG. 4 shows changes in the posterior densities of one particle during four time steps from the example shown in FIG. 3. The three states are indicated by the roman numerals I, II and III. Note that these graphs are all priors and posterior densities in the system variable domain. The likelihood densities in the observation variable domain would be wider, e.g. $p(\theta_3|\gamma=2)$ is almost a delta function, so the likelihood density would look very similar to $p(\theta_1|\gamma=2)$ as the variance=R.

When a particle changed state, its belief of the old state was reinitialised. When using PPFs for rig state detection systems, if it is known that the driller previously held the weight-on-bit near 10 klbf when drilling, it is risky to assume that the driller will do the same next time.

Each particle $s_t^i$ incorporated $\gamma_t^i$, the belief of the state of the HMM and $\alpha_t^i$, the particles' support points, $$s_t^i = (\gamma_t^i a_t^i b_t^i c_t^i P_t^i) \quad (14)$$

where $a_t^i$, $b_t^i$ and $c_t^i$ are the posterior means of the three states (i.e. equation (11) for each of the Kalman filters), and $P_t^i$ is the posterior variance of the active Kalman filter (both dormant filters had variance R, so it is inefficient to store this information in each particle).

The Kalman model was the same for each state F=H=1, Q=0, R=0.3, $P_1$=R. The choice of transition probabilities $$P(\gamma_{t+1} \mid \gamma_t) = \begin{pmatrix} 1-P_J & P_J & 0 \\ P_J & 1-2P_J & P_J \\ 0 & P_J & 1-P_J \end{pmatrix} \quad (15)$$

is fundamental to the filter behaviour in this example. Direct jumps between states 1 and 3 were not permitted, so the filter estimated that the likelihood of being in state 1 at t=48 was negligible, despite the observation being close the mean of state 1. It was assumed that the HMM would remain in a state length for approximately 20 samples, so the probability of jumping $P_j$ was set to $1/20$=0.05. Increasing $P_j$ would increase the likelihood of mini-states existing at t=33, 72 and 88.

It would be relatively simple to define an observation model with $x_t$ as a vector of the four surface channels and form a corresponding system model, but as the dimensionality of the problem increases, the number of particles required increases exponentially. In problems where the useful information is easier to extract from some channels than others, modeling the simpler channels with a non-evolving likelihood reduces the dimensionality of the problem. The weight equation for the new particles then becomes $$\tilde{m}_{t+1}^{i,j} \propto m_t^i p(a_{t+1} \mid \gamma_{t+1} = j, \alpha_t^j) \frac{p(b_{t+1} \mid \gamma_{t+1} = j)}{p(b_t \mid \gamma_t^i)} P(\gamma_{t+1} = j \mid \gamma_t^i) \quad (16)$$

where $\tilde{m}_{t+1}^{i,j}$=weight of the jth descendent of ith particle $m_t^i$=weight of ith particle=parent's weight $a_t$=observations requiring an evolving density $b_t$=observations not requiring an evolving density $\gamma_t$=hidden state=rig state $\alpha_t^i$=vector of parameters that contain the belief of the parent $p(a_t| \ldots)$=Gaussian likelihood from the Kalman filter $p(b_t| \ldots)$=non-evolving likelihood $P(\gamma_t| \ldots)$=transition probability This approach is demonstrated in the following example of a rig state detection system using only HKLD and BPOS channels. The signal-to-noise ratio of the BPOS channel is usually very high, so this channel was modelled with a non-evolving likelihood, giving $$\tilde{m}_{t+1}^{i,j} \propto \quad (17)$$

$$m_t^i p(HKLD_{t+1} \mid \gamma_{t+1} = j, \alpha_t^j) \frac{p(BVEL_{t+1} \mid \gamma_{t+1} = j)}{p(BVEL_t \mid \gamma_t^i)} P(\gamma_{t+1} = j \mid \gamma_t^i).$$

The relevant priors for HKLD and likelihoods for BVEL are given in the following table (the TQA and SPPA likelihoods can be ignored until a later example).

Table of Priors and Likelihoods

| State | Alternative name | HKLD | BVEL | TQA | SSPA |
|---|---|---|---|---|---|
| DrillRot | Rotary mode drilling | $U(B, T + 2\sigma_T)$ | $U(-V_{DRILL}, 2\sigma_V)$ | $U(\mu_{TQ0} - 3\sigma_{TQ0}, TQ_{DRILL})$ | ON |
| DrillSlide | Slide mode drilling | As above | As above | As StaticPump | ON |
| RihPumpRot | Reaming in | $0.8U(B, T + 2\sigma_T) + 0.2U(T + 2\sigma_T, T + O)$ | $U(-V_{TRIP}, 0)$ | As DrillRot | ON |
| RihPump | Sliding in | As above | As above | As StaticPump | ON |
| Rih | Tripping in | As above | As above | As StaticPump | OFF |
| PoohPumpRot | Reaming out | $0.2U(B, T - 2\sigma_T) + 0.8U(T - 2\sigma_T, T + O)$ | $U(0, V_{TRIP})$ | As DrillRot | ON |
| PoohPump | Sliding out | As above | As above | As StaticPump | ON |
| Pooh | Tripping out | As above | As above | As StaticPump | OFF |
| StaticPumpRot | Circ. & rot. | $N(T, \sigma_T^2)$ | $N(0, \sigma_V^2)$ | As DrillRot | ON |
| StaticPump | Circulating | As above | As above | $N(\mu_{TQ0}, \sigma_{TQ0}^2)$ | ON |
| Static | Off bottom | As above | As above | As above | OFF |
| InSlips |  | $N(B, \sigma_B^2)$ | $U(-V_{SLIPS}, 0)$ | As StaticPump | As below |
| Unclassified |  | $U(B, T + O)$ | $U(-V_{TRIP}, V_{TRIP})$ | $U(2\mu_{TQ0}, TQ_{DRILL})$ | $U(0, C)$ |

Key:
U(low, high) = uniform pdf
N(mean, variance) = Gaussian pdf
Other symbols explained overleaf

|  | Symbol | Description | Value |  | Source |
|---|---|---|---|---|---|
| HKLD | T | THKD (total hookload) | 210 | klbf | Supplied by the acquisition system |
|  | $\sigma_T$ | uncertainty in T | 5 | klbf | Estimated from StaticPumpRot states |
|  | O | maximum overpull | 150 | klbf | Conservative estimate |
|  | B | weight of travelling block | 85 | klbf | Estimated from InSlips states |
|  | $\sigma_B$ | uncertainty in B | 10 | klbf | Estimated from InSlips states |
| BVEL | $V_{TRIP}$ | maximum tripping speed (up or down) | 3 | ft/s | Conservative estimate |
|  | $V_{DRILL}$ | maximum ROP | 0.2 | ft/s | Conservative estimate |
|  | $V_{SLIPS}$ | maximum speed of pipe hitting slips | 0.2 | ft/s | Conservative estimate |
|  | $\sigma_V$ | uncertainty in BVEL | $10^{-3}$ | ft/s | Conservative estimate |
| TQA | $\mu_{TQ0}$ | zero calibration of TQA | −0.5 | kflb | Estimated from InSlips states |
|  | $\sigma_{TQ0}$ | uncertainty in $\mu_{TQ0}$ | 10 | kflb | Estimated from InSlips states |
|  | $TQ_{DRILL}$ | maximum torque whilst drilling | 260 | kflb | Estimated from DrillRot states |

Figure 12:
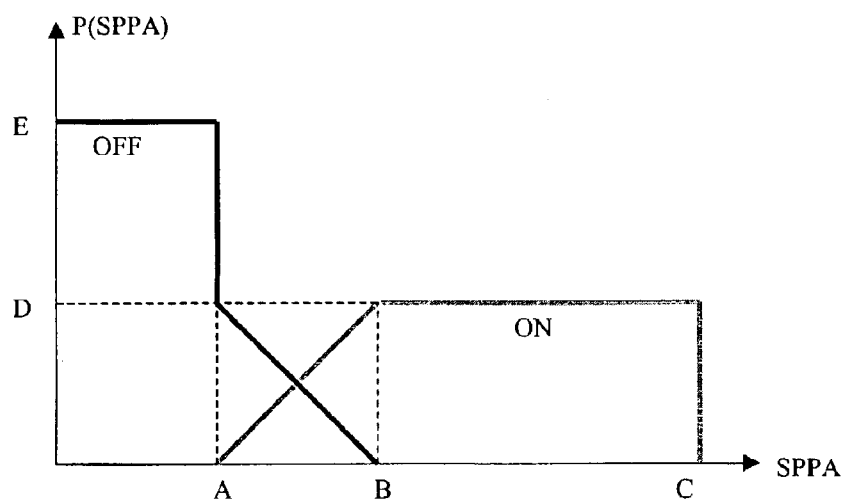
FIG. 12 illustrates piecewise linear standpipe pressure likelihoods for the cases of pumps on and pumps off, according to a described example.

FIG. 12 illustrates the piecewise linear standpipe pressure likelihoods for the cases of pumps on and pumps off, according to this example. In FIG. 12, A=500 psi, B=1000 psi, C=5000 psi, D=2/(2C−B−A), E=(2C−2B)/(A(2C−B−A))

Conservative estimates are preferably be treated is constants. Parameters that are estimated from particular states will vary from rig to rig and many will vary with depth. These estimates can be made by personnel or by a calibration algorithm. The values in the above table were used for the examples shown.

"Bit on bottom" and "in slips" indicators from systems such as IDEAL™ are useful for automatic calibration.

B and $\sigma_B$ are preferably set to the median and standard deviation of HKLD data when the "in slips" indicator is true.

$\mu_{TQO}$ is preferably set to the median of the TQA data when the "in slips" indicator is true. Using only the TQA data less than $\mu_{TQO}$ when the "in slips" indicator is true, the standard deviation from $\mu_{TQO}$ is calculated and assigned to $\sigma_{TQO}$. This automatically rejects make-up and break-out torques.

$TQ_{DRILL}$ is preferably set to the maximum value of TQA whilst the "bit on bottom" indicator is true.

Figure 5:
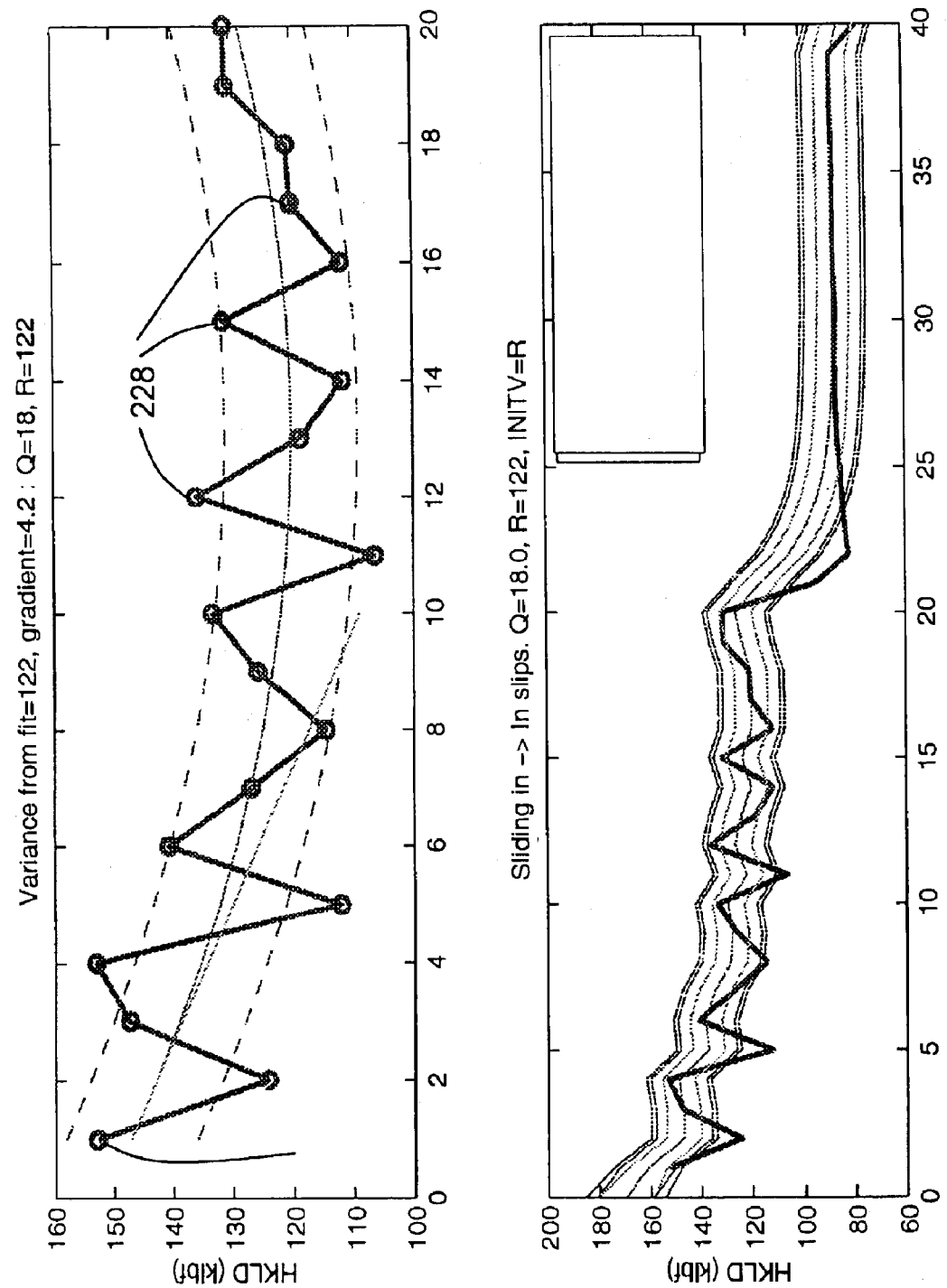
FIG. 5 shows an example of the parameters of the Kalman filter optimised for detecting the state "InSlips"

Detecting when the drill string goes into slips is very important, so the Kalman filter is preferably optimised for this transition. FIG. 5 shows the parameters of the Kalman filter optimized for detecting the state "InSlips." Plot (a) shows hookload versus sample number for a limited number selected samples. The hookload data is shown by points 228 joined by thick line 230. A quadratic 242 is fitted to the hookload data as shown. Also shown by the dotted lines 240 is 3 standard deviations from the fitted quadratic. The observation noise variance R is estimated by fitting a quadratic 242 to the 'RihPump' HKLD data shown in FIG. 5(a). The maximum gradient of the quadratic fit was 4.2 klbf/s, shown by line 244. It was assumed that the system noise process should be capable of generating a sample of this magnitude as a 1-sigma event, so Q was set at $4.2^2=18$.

In FIG. 5(b) also shows hookload data versus sample number, but for a wider range of samples. In this example, the hookload data line is again denoted with numeral 230. The Kalman estimate is shown by line 232, which is surrounded first by the standard deviation of the Kalman estimate 234, then by the standard deviation of the observation noise, R (shown by lines 236), and finally by the standard deviation of the Kalman error+R (shown by lines 238). As the Kalman filter cannot track the transition very quickly, the descendent of a 'RihPump' particle also in the 'RihPump' state will obtain a much lower weight than the descendent in the 'in slips' state sitting down at ~85 klbf.

The block will continue to drop a few inches after the pipe has gone into slips, so a change in BVEL will lag a change in HKLD and is therefore less useful for detecting in slips accurately. SPPA and TQA contain no information about the transition, so the processing of HKLD must be as accurate as possible.

Figure 6:
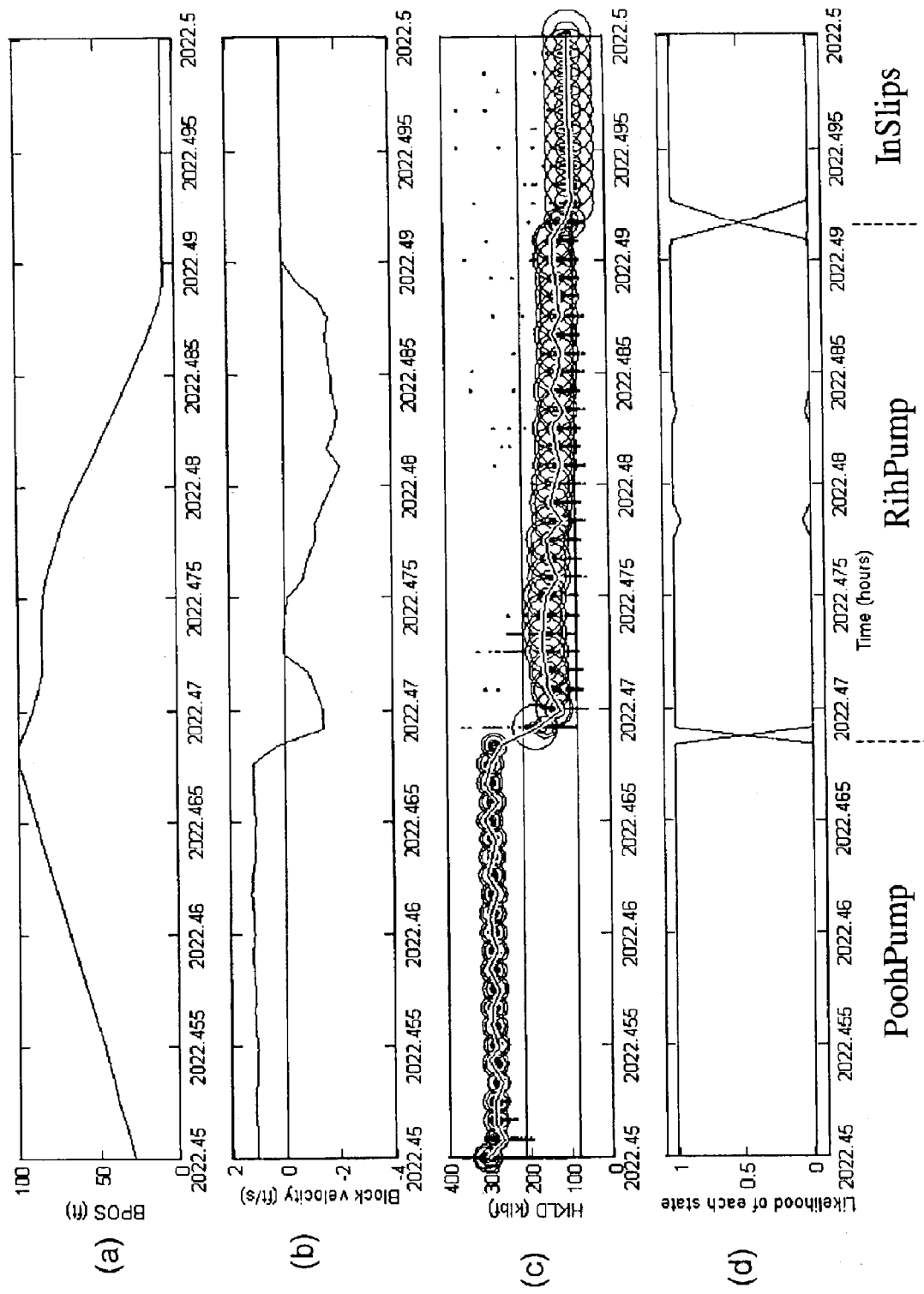
FIG. 6 shows a parametric particle filter detecting 'PoohPump', 'RihPump' and 'InSlips' states using HKLD and BPOS data.

FIG. 6 shows the PPF detecting 'PoohPump', 'RihPump' and 'in slips' states using HKLD and BPOS data, according to a preferred embodiment of the invention. Plot (a) shows the block position and plot (b) shows block velocity, which is a function of block position. Plot (c) shows the hookload input channel. As used herein, input channels are "independent" when one input channels is not a direct function of the other input channel. Thus block position and block velocity are not independent from one another, but they are both independent of the hookload input channel.

As in FIG. 3(a), in plot(c) the centre of each circle indicates a particle and its radius indicates the particle weight. The overwhelming state of the particles is noted by the state names at the bottom of FIG. 6, namely "PoohPump", "RihPump" and "InSlips." In this example, 100 particles were used. Plot (d) shows detected state probabilities by summing particle weight at each sample number.

An example of a rig state detection system using four input channels will now be described. The installation of an RPM sensor is much more complex than a torque (TQA) sensor, so most oilfield drilling jobs rely on the latter only. Note that if it becomes practical to provide an RPM sensor on the rig, RPM would be much preferred over Torque as an input channel to the automatic rig state detecting system. For state detection, TQA is used to differentiate between rotating and non-rotating states that otherwise look very similar, e.g. 'RihPump' and 'RihPumpRot'. Any torque above a noise floor would count as rotating. The statistics of TQA in the non-rotating state should be approximately stationary, so an evolving likelihood is not necessary. The TQA likelihoods are shown in the likelihood table above.

Similarly, most of the information in SPPA is also binary—pumps on or off, for distinguishing 'RihPump' from 'Rih'. The weight of the new particles is therefore:

$$\tilde{m}_{t+1}^{i,j} \propto m_t^i p(HKLD_{t+1}|\gamma_{t+1}=j, \alpha_t^i) P(\gamma_{t+1}=j|\gamma_t^i) L_{t+1}^j / L_t^j \quad (18)$$

where $L_{t+1}^j = p(BVEL_{t+1}|\gamma_{t+1}=j) p(TQA_{t+1}|\gamma_{t+1}=j) p(SPPA_{t+1}=j)$ is not particle dependent, so need only be calculated once per time step.

Figure 7:
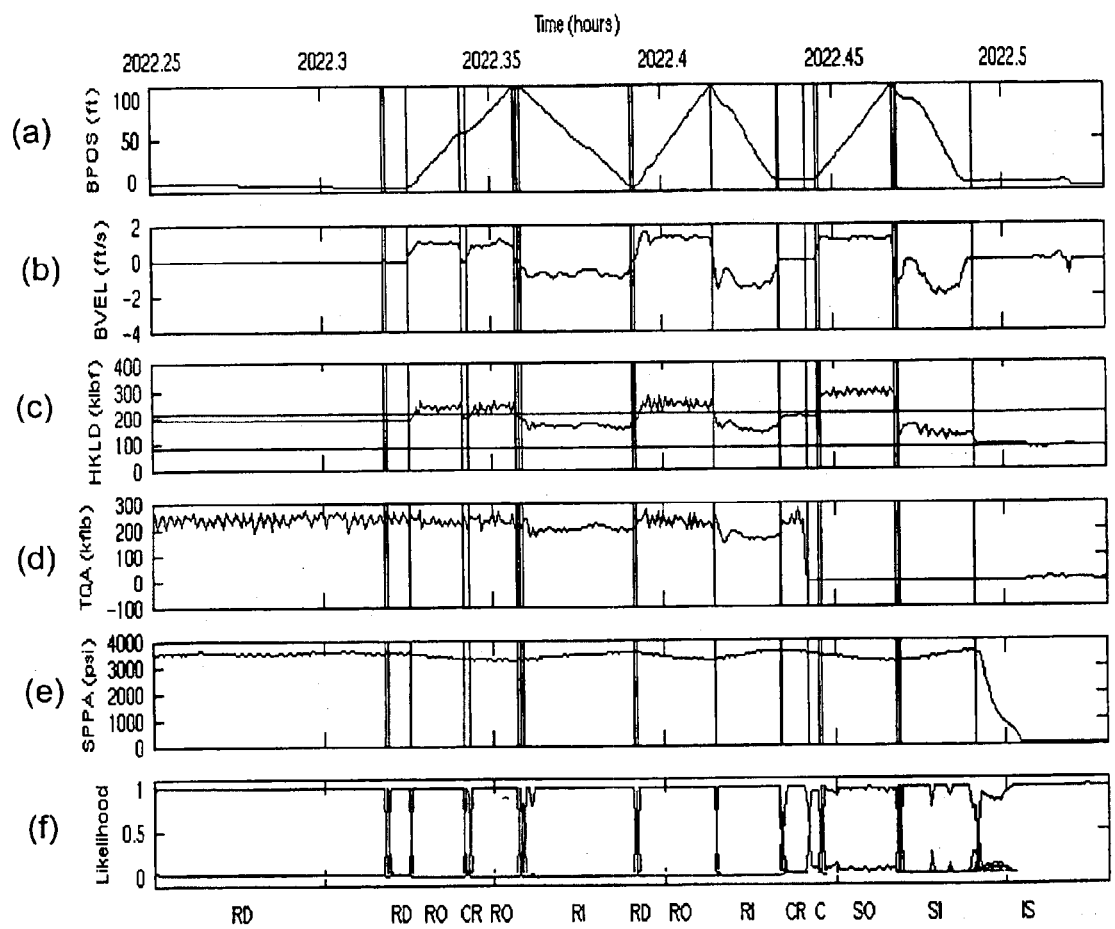
FIG. 7 shows plots of the inputs and output of a rig state detection system.

FIG. 7 shows plots of the inputs and output of a preferred rig state detection system. In the case of FIG. 7, the same data was used as in the example of FIG. 6 but it includes a wider range of samples. In the case of FIG. 7 a preferred PPF based algorithm was applied to 16 minutes of drilling data. Rows a-e show block position, block velocity, Hookload, torque and standpipe pressure respectively. Row f shows the output of the rig state detection. The individual states are expressed in terms of a probability. Note that in FIG. 7, eight out of the proposed thirteen states have been implemented to date and are shown in plot (f) of FIG. 7. In plot (f), the two letter labels refer to the following rig states: RD=DrillRot, RO=PoohPumpRot, CR=StaticPumpRot, RI=RihPumpRot, C=StaticPump, SO=PoohPump, SI=RihPump, and IS=InSlips.

In the present example, the transition matrix P was assigned uniform values to simplify interpretation. Even more realistic values are preferred so as to improve the state detection. An example of an unlikely state sequence is drilling in rotary mode occurring directly after drilling in slide mode (DrillSlide). This is because drag forces are greater during slide mode drilling, so if rotation began whilst on bottom, the weight-on-bit could quickly become undesirably high. DrillSlide, PoohPump ~5 ft, RihPumpRot ~5 ft, DrillRot is a more typical sequence.

The first 12 states in the above table of priors and likelihoods deliberately leave gaps in the parameter space of the four surface channels, which correspond to very unlikely or potentially damaging operations, e.g. if the BHA contains a mud motor, RIH whilst rotating but not pumping is a very risky operation, as if the bit touched the borehole wall and rotated, it would suck mud and possibly cuttings into the motor. To cover these gaps and prevent instability in the software, a state called 'unclassified' with very broad priors is defined.

Figure 8:
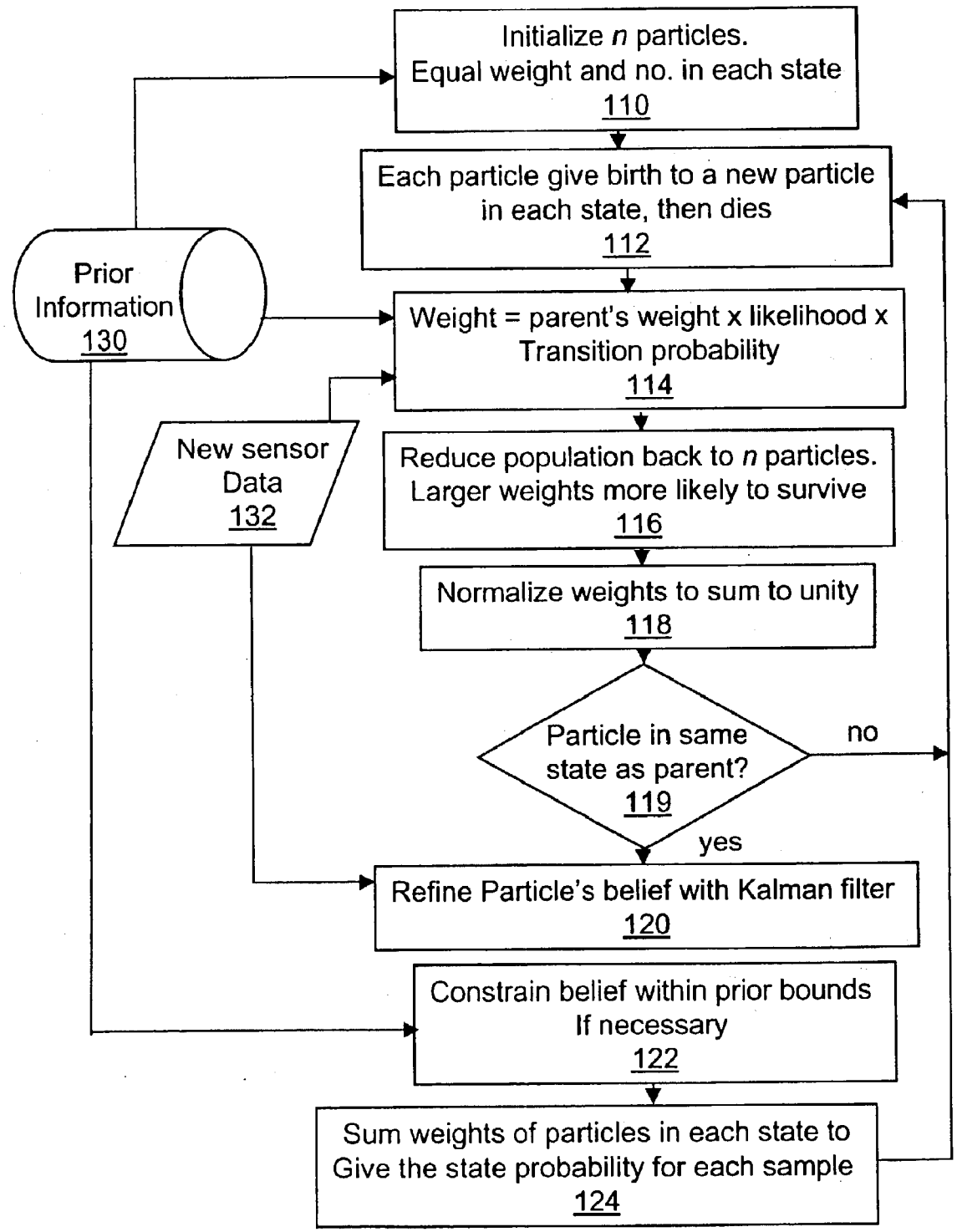
FIG. 8 shows steps involved in a system for automatic rig state detection.

FIG. 8 shows steps involved in a system for automatic rig state detection. In particular, FIG. 8 shows steps for using a parametric particle filtering method for automatic rig state detection. In step 110, n particles are initialized with equal weight and equal number of particles in each state. The particles are preferably randomly sampled from likelihood distributions which form part of prior information 130. For examples of suitable likelihood distributions see "Table of all priors and likelihoods" above. Note that the likelihood distributions form $\alpha_t^i$ in equation (16). In step 112, each particle give "birth" to a new particle in each state, and then "dies." In step 114, the weight is calculated as the parent's weight time the likelihood times the transition probability. The likelihood distributions from prior information 130 and the new sensor data 132 (i.e. input channels) are preferably incorporated according to equation (16). In steps 116 and 118, the population is reduced back to n particles, with the larger weights more likely to survive, and the weights are normalized to sum to unity. The preferred method for carrying out these steps is described above in the description following equation (6). In step 119, the state of the particle is compared with that of its parent. If they are not the same, step 112 should be repeated for the next sample. If they are not the same the particle's belief is preferably refined using the Kalman filter using data 132 according to equations (9)

to (13) above. In step 122, the beliefs are constrained within prior bounds if necessary, preferably using likelihood models in prior information 130, such as from the table above. In step 124, the weights of the particles are summed in each state, thereby yielding the state probability for each sample, and then step 112 is repeated for the next sample.

When the drilling conditions have made the occurrence of a particular drilling event quite likely, it may be known a priori that changing to a particular rig state could greatly exacerbate the problem. For example, on the verge of a pack-off event, the driller should not pull-out-of-hole until the borehole has been circulated sufficiently thoroughly for the probability of pack-off to fall to a reasonable level. A prediction of the next rig state can be derived from the current state probabilities and the transition probabilities, $$P(\gamma_{t+1} = k \mid data_{1:t}) = \sum_{\gamma_t} P(\gamma_{t+1} = k \mid \gamma_t) P(\gamma_t \mid data_{1:t}) \quad (19)$$

If the event probability is high and the probability of an undesirable next rig state is high, the algorithm preferably reminds the driller not to change into that particular rig state. The same technique is preferably applied recursively to predict the rig state a number of samples ahead.

Alternatively, additional input channels may be used and the rig state accurately detected without the use of particle filtering techniques. For example, the rig state detection system makes use of two input channels from a known drilling acquisition system, known as IDEAL™ from Schlumberger. Specifically two binary indicators are used: (1) BONB which indicates when the bit is on bottom, and (2) STIS which indicates when the pipe is in slips.

Bayes' rule gives, $$P(\gamma_t = j \mid b_t) = \frac{p(b_t \mid \gamma_t = j) P(\gamma_t = j)}{\sum_{\gamma_t} p(b_t \mid \gamma_t) P(\gamma_t)} \quad (20)$$

where $P(\gamma_t = j \mid b_t)$=posterior probability of state j
$p(b_t \mid \gamma_t = j)$=multivariate likelihood of state j
$P(\gamma_t = j)$=prior probability of state j
Modeling the likelihoods independently gives, $$P(b_t \mid \gamma_t = j) = p(HKLD_t \mid \gamma_t = j) p(BVEL_t \mid \gamma_t = j) p(SPPA_t \mid \gamma_t = j) \times p(TQA_t \mid \gamma_t = j) P(BONB_t \mid \gamma_t = j) P(STIS_t \mid \gamma_t = j) \quad (21)$$

Extending the likelihood table to include the binary indicators gives the following table.

According to another alternative embodiment, fuzzy logic is used to automatically detect rig states instead of or in combination with the probabilistic methods described above.

In the present invention, the automatically detected rig state information is used as part of a larger system including event detection. In particular, it has been found that the ability to diagnose certain drilling problems is greatly improved by incorporating the automatically detected rig state.

According to one embodiment, an improved diagnostic tool for detecting problems associated with stuck pipe is provided. The tool preferable builds on a known diagnostic tool such as SPIN doctor™ from Schlumberger. The known tool queries the drill rig personnel about the rig state when the pipe became stuck. See *Managing Drilling Risk*, Aldred et al. Oilfield Review, summer 1999, at page 11. According to the invention, the diagnostic tool, such as SPIN-DR, is modified to take the input directly from the automatic rig state detection system as described above to greatly improve and automate the detection of the onset of pipe sticking.

Figure 9:
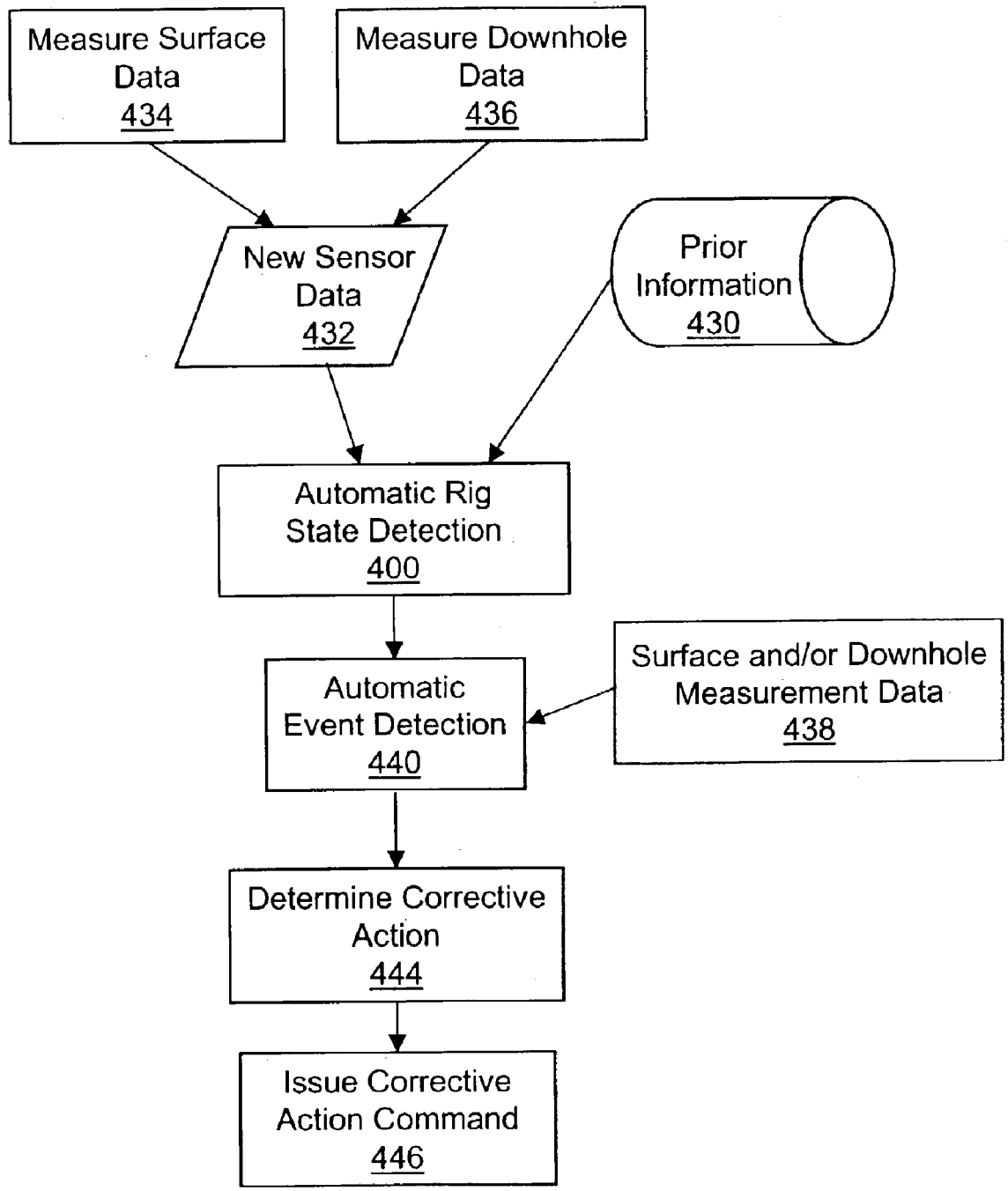
FIG. 9 shows a schematic computer system for override control of a wellbore drilling process.

Drilling Process Override Systems Including Automatic Rig State and Event Detection FIG. 9 shows a schematic computer system for override control of a wellbore drilling process. In step 434 measured surface data are received or sensed. Examples include hookload, block position or velocity, standpipe pressure, torque, as well as detected inputs such as the "bit on bottom" and "in slips" indicators from system such as IDEAL™. In step 436, measured downhole data are received, such as MWD or LWD data. In step 432, the data are inputted to the automatic rig state detection system 400, such as described above with reference to FIG. 8. As described in FIG. 8, prior information 430 is also inputted to the rig state detection system 400. From the detection system 400 the rig state information (which is preferably in the form of a probability) is inputted into event detection systems.

In one embodiment, the automatically detected events and the state(s) during which they occurred are fed directly into a knowledge base such as the commercially used software known as RiskTRAK™ from Schlumberger. Risks identified within RiskTRAK™ can then be used as inputs to the automatic rig state detectors. In particular the identified risks can be used to alter the prior probabilities of the event detection algorithms.

In step 440 the rig state information is correlated with measurement data 438 acquired from the surface and/or downhole in order to monitor for undesirable events. This measurement data may include data which was used to detect the rig state. Typical examples are standpipe pressure

| State | Rotation | Pumping | Block movement | Hookload | BONB | STIS |
|---|---|---|---|---|---|---|
| DrillRot | ✓ | ✓ | ↓ | Low | 1 | 0 |
| DrillSlide | x | ✓ | ↓ | Low | 1 | 0 |
| RihPumpRot | ✓ | ✓ | ↓ | Low | 0 | 0 |
| RihPump | x | ✓ | ↓ | Low | 0 | 0 |
| Rih | x | x | ↓ | Low | 0 | 0 |
| PoohPumpRot | ✓ | ✓ | ↑ | High | 0 | 0 |
| PoohPump | x | ✓ | ↑ | High | 0 | 0 |
| Pooh | x | x | ↑ | High | 0 | 0 |
| StaticPumpRot | ✓ | ✓ | x | ~T | 0 | 0 |
| StaticPump | x | ✓ | x | ~T | 0 | 0 |
| Static | x | x | x | ~T | 0 | 0 |
| InSlips | x | Either | ↓ | ~B | 0 | 1 |
| Unclassified | Either | Either | Any | Any | Either | Either | and torque. However, it may also include other data such as MWD or LWD data.

For example, annular pressure while drilling (APWD) measurement data, which are being increasingly used in operations such as underbalanced, extended-reach, high-pressure high-temperature (HPHT) and deep-water drilling, can be correlated with rig state to interpret the effects of pipe rotation, cuttings load, swab and surge, leak-off tests (LOTS), formation integrity tests (FITS) and lost circulation.

The measurement data 438 may be supplemented with data from an earth model. An example of an earth model is given in WO 01/25823.

In general, in step 440, the automatic event detection is greatly improved through the use of automatic rig state detection. Preferably, in step 440, the rig state information is used to apply different variations of the event detection algorithm depending on the particular rig state. If the event detection is based on threshold parameters, the threshold levels could beset optimally for each rig state, thereby significantly reducing the false positives and false negative of the event detector. However, as an alternative to threshold based techniques, event detection preferably calculates the probability that the event has occurred or will do shortly. If an alarm is to be raised, this is preferably a threshold on the calculated probability.

Furthermore, if a particular event detector comprises a number of parallel models or components, these can be selectively disactivated when the rig is determined to be in a particular state, which can improve the reliability of the detector.

For example, one component of a kick event detector may be a swab predictor. The swab predictor should be activated when the detected state involves drill pipe movement, as in e.g. Pooh (tripping out). However, if the detected state implies no drill pipe movement, as in e.g. InSlips, the swab predictor (and any other predictors which are only relevant when there is drill pipe movement) can be disactivated so as to reduce the likelihood of false alarms from the kick detector.

Step 440 may involve monitoring for some or all of the following undesirable events:

Kick

Stuck pipe

Lost circulation

Drill bit stick-slip

Plugged drill bit nozzles

Drill bit nozzle washout

Over- or under-sized gauge hole

Drill bit wear

Mud motor performance loss

Drilling-induced formation fractures

Ballooning

Poor hole cleaning

Pipe washout

Destructive vibration

Accidental sidetracking

Twist-off onset each event preferably having its own dedicated detector.

When an undesirable event is detected, the system determines 444 a corrective drilling rig action which will avert or mitigate the event. The system then issues a corrective action command 446 to the rig, which has suitable computer-controlled equipment for implementing the command. Some examples of events and possible corrective actions are discussed below. The appropriate action can be identified e.g. using a look-up table, or using an "intelligent" system such as the improved SPIN-DR system discussed above.

The system can provide a warning to the driller that it is overriding a drilling process. It can also provide indications of the action it is taking and the event which the action is intended to address.

We now describe events and possible corrective actions in relation to example override systems.

EXAMPLE 1

In general a drill bit has almost the same diameter as the borehole itself, so when raising a drill string, the bit acts like a piston and the pressure of the mud below the bit is reduced. This swab pressure can allow reservoir fluids to enter the wellbore if the drill string is raised too quickly, which may lead to a kick or a blowout. Conversely, as the string is lowered, the pressure of the mud below the bit is increased. This surge pressure can fracture the formation, leading to mud loss and wellbore stability problems. At each point along the wellbore, the maximum safe surge pressure and the minimum safe swab pressure can be calculated e.g. from an earth model. Downhole pressure can be measured directly or modeled.

An example system for preventing dangerous swab and surge pressures detects the state of the drilling rig, and acquires downhole pressure and drill bit depth measurement data. If at any point along the wellbore the maximum/minimum safe threshold pressure for the detected state has been or is about to be exceeded, the system overrides the driller's command to move the drill string and imposes a safe drill string velocity so that the pressure remains within safe bounds.

EXAMPLE 2

The operation of returning a bit to the bottom of the well should be performed gently to prevent damage to the bit and to avoid entering a vibrational mode that may be difficult to exit. An example override system detects the state of the drilling rig and acquires drill bit depth measurement data. When the detected state is one in which the drill bit can approach the hole bottom, the system compares the depth of the bit with the depth of the hole. If the bit approaches the bottom too quickly, the system overrides the driller's control and decelerates the drill string sufficiently quickly such that the bit tags bottom gently.

EXAMPLE 3

Above a certain torque, a downhole mud motor will generally stall, and the bit must then be pulled off bottom to restart rotation. Clearly, it is desirable to avoid restarting the motor in this way. However, downhole torque can be both measured and modeled so that when a driller attempts to exceed the maximum downhole torque of the motor for a relevant rig state, an example system can override his command and lower the torque to prevent the motor from stalling.

EXAMPLE 4

The override system may include a washout detection system. According to this embodiment, the following steps are performed. Determine the relationship between pump pressure and mud flow rate for the rig states where pumping is occurring. Calculate surface flow rate from surface data collected at the pumping system. Calculate downhole flow rate from MWD turbine assembly. Compare the surface and downhole flow rates within like states. For example, the calculations for PoohPumpRot and DrillSlide are preferably performed separately. If a discrepancy appears between surface and downhole flow rate among like states, a washout event is indicated. For further detail about washout detection see, Schlumberger Drilling and Measurements overview flier entitled "Washout Alarm" (http://www.hub.slb.com/Docs/DandM/GraphicsFolder/DM_Overview s/Washout_alarm.pdf). The corrective action may be to suspend drilling operations preparatory to tripping out so that the pipe tool joints can be inspected for the washout.

EXAMPLE 5

The override system may include a bit wear detection system based on mechanical efficiency analysis. Mechanical efficiency analysis techniques for detecting bit wear are known. See, U.S. Pat. No. 4,685,329, and "Measuring the Wear of Milled Tooth Bits Using MWD Torque and Weight-on-Bit" Burgess and Lesso, SPE/IADC 13475. An improved bit wear detection system can be provided by separating the data into different cases based on the state of the rig: (1) rotary drilling (DrillRot), (2) sliding drilling (DrillSlide), and (3) other states. The data from the non drilling states (other states) is ignored. The data for rotary drilling and slider drilling are then analysed separately, by fine tuning the torque and weight relationships for each case. The different analyses preferably make use of the fact that since the downhole torque sensor is typically positioned above the mud motor, while rotary drilling the direct torque is sensed, and during sliding drilling, the reactive torque is sensed. If a worn bit is detected the corrective action may be to suspend drilling operations preparatory to tripping out in order to replace or repair the bit.

EXAMPLE 6

The override system may include an event detection system which makes use of torque and drag analysis. Commercially available torque and drag analysis software such as DrillSAFE™ part of Schlumberger DrillingOffice™ or DeaDrag8™ from Drilling Engineering Assocation can be modified to automatically accept rig state information to determine which mode of torque and drag analysis to run. This automation allows continuous modelling of drill string tensile and torque measurements to be performed. Comparison of these modelled data with actual measurements allows multiple forms of events such as stuck pipe, hole cleaning problems, twist off, and sloughing shales to be detected. The appropriate corrective action for each event can then be determined.

Figure 10:
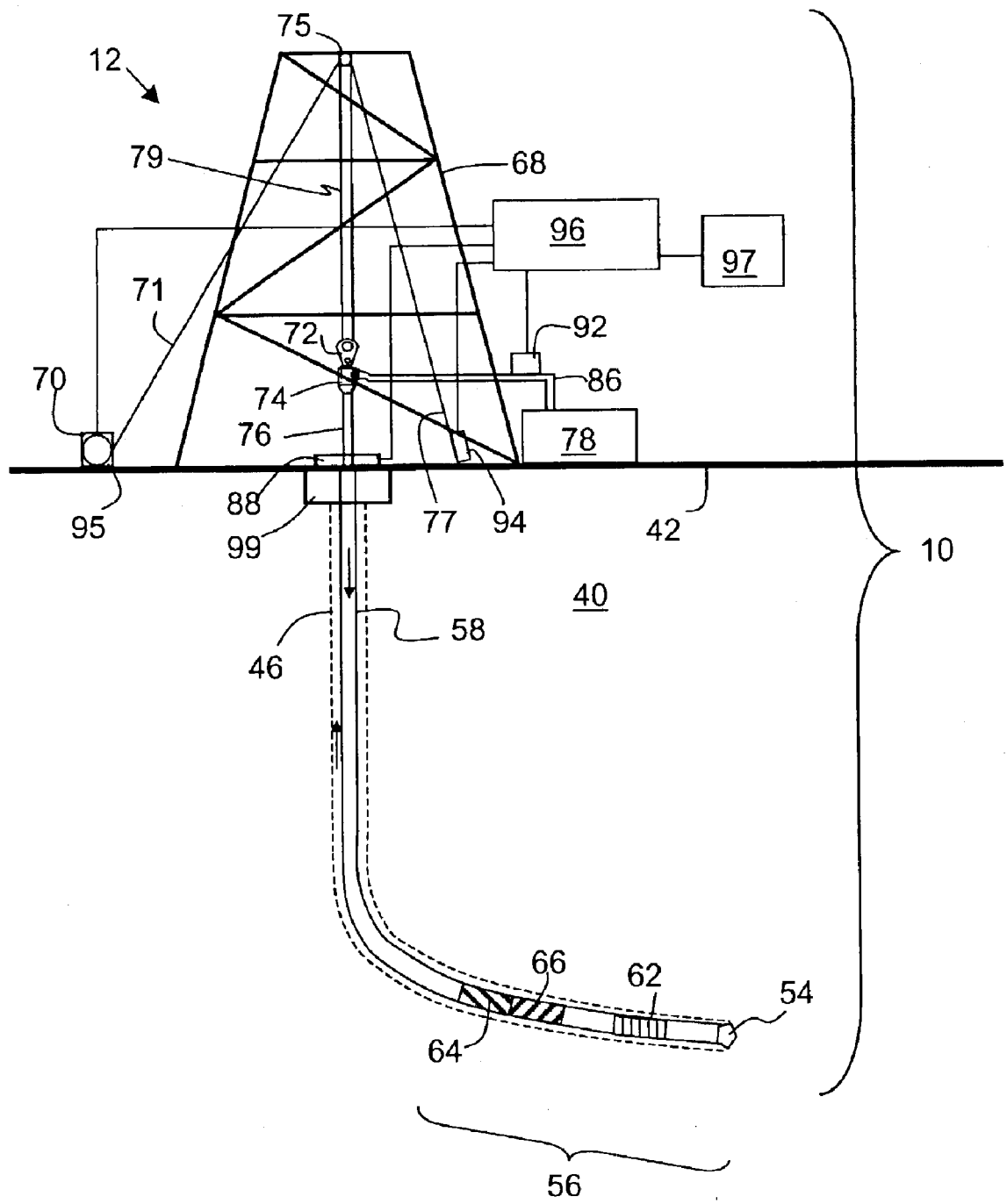
FIG. 10 shows a drilling system having automatic rig state detection and override control, according to preferred embodiments of the invention.

One example of a drilling system having automatic override capability is shown in FIG. 10. Drill string 58 is shown within borehole 46. Borehole 46 is located in the earth 40 having a surface 42. Borehole 46 is being cut by the action of drill bit 54. Drill bit 54 is disposed at the far end of the bottom hole assembly 56 that is attached to and forms the lower portion of drill string 58. Bottom hole assembly 56 contains a number of devices including various subassemblies. According to the invention measurement-while-drilling (MWD) subassemblies are included in subassemblies 62. Examples of typical MWD measurements include direction, inclination, survey data, downhole pressure (inside the drill pipe, and outside or annular pressure), resistivity, density, and porosity. Also included is a subassembly 60 for measuring torque and weight on bit. The signals from the subassemblies 62 are preferably processed in processor 66. After processing, the information from processor 66 is then communicated to pulser assembly 64. Pulser assembly 64 converts the information from processor 66 into pressure pulses in the drilling fluid. The pressure pulses are generated in a particular pattern which represents the data from subassemblies 62. The pressure pulses travel upwards though the drilling fluid in the central opening in the drill string and towards the surface system. The subassemblies in the bottom hole assembly 56 can also include a turbine or motor for providing power for rotating and steering drill bit 54.

The drilling rig 12 includes a derrick 68 and hoisting system, a rotating system, and a mud circulation system. The hoisting system which suspends the drill string 58, includes draw works 70, fast line 71, crown block 75, drilling line 79, travelling block and hook 72, swivel 74, and deadline 77. The rotating system includes kelly 76, rotary table 88, and engines (not shown). The rotating system imparts a rotational force on the drill string 58 as is well known in the art. Although a system with a Kelly and rotary table is shown in FIG. 10, those of skill in the art will recognize that the present invention is also applicable to top drive drilling arrangements. Although the drilling system is shown in FIG. 10 as being on land, those of skill in the art will recognize that the present invention is equally applicable to marine environments.

The mud circulation system pumps drilling fluid down the central opening in the drill string. The drilling fluid is often called mud, and it is typically a mixture of water or diesel fuel, special clays, and other chemicals. The drilling mud is stored in mud pit 78. The drilling mud is drawn in to mud pumps (not shown), which pumps the mud though stand pipe 86 and into the kelly 76 through swivel 74 which contains a rotating seal. In invention is also applicable to underbalanced drilling. If drilling underbalanced, at some point prior to entering the drill string, gas is introduced into drilling mud using an injection system (not shown).

The mud passes through drill string 58 and through drill bit 54. As the teeth of the drill bit grind and gouges the earth formation into cuttings the mud is ejected out of openings or nozzles in the bit with great speed and pressure. These jets of mud lift the cuttings off the bottom of the hole and away from the bit, and up towards the surface in the annular space between drill string 58 and the wall of borehole 46.

At the surface the mud and cuttings leave the well through a side outlet in blowout preventer 99 and through mud return line (not shown). Blowout preventer 99 comprises a pressure control device and a rotary seal. The mud return line feeds the mud into separator (not shown) which separates the mud from the cuttings. From the separator, the mud is returned to mud pit 78 for storage and re-use.

Various sensors are placed on the drilling rig 10 to take measurement of the drilling equipment. In particular hookload is measured by hookload sensor 94 mounted on deadline 77, block position and the related block velocity are measured by block sensor 95 which is part of the draw works 70. Surface torque is measured by a sensor on the rotary table 88. Standpipe pressure is measured by pressure sensor 92, located on standpipe 86. Signals from these measurements are communicated to a central surface processor 96. In addition, mud pulses traveling up the drillstring are detected by pressure sensor 92. Pressure sensor 92 comprises a transducer that converts the mud pressure into electronic signals. The pressure sensor 92 is connected to surface processor 96 that converts the signal from the pressure signal into digital form, stores and demodulates the digital signal into useable MWD data. According to various embodiments described above, surface processor 96 is programmed to automatically detect the most likely rig state based on the various input channels described. Surface processor 96 is also programmed to carry out the automated event detection as described above.

Surface processor 96 transmits the rig state and event detection information to override processor 97 which identifies appropriate rig actions for avoiding or mitigating undesirable events. The surface processor and override processor are shown as separate devices, but in practice they may combined into one device.

Figure 11:
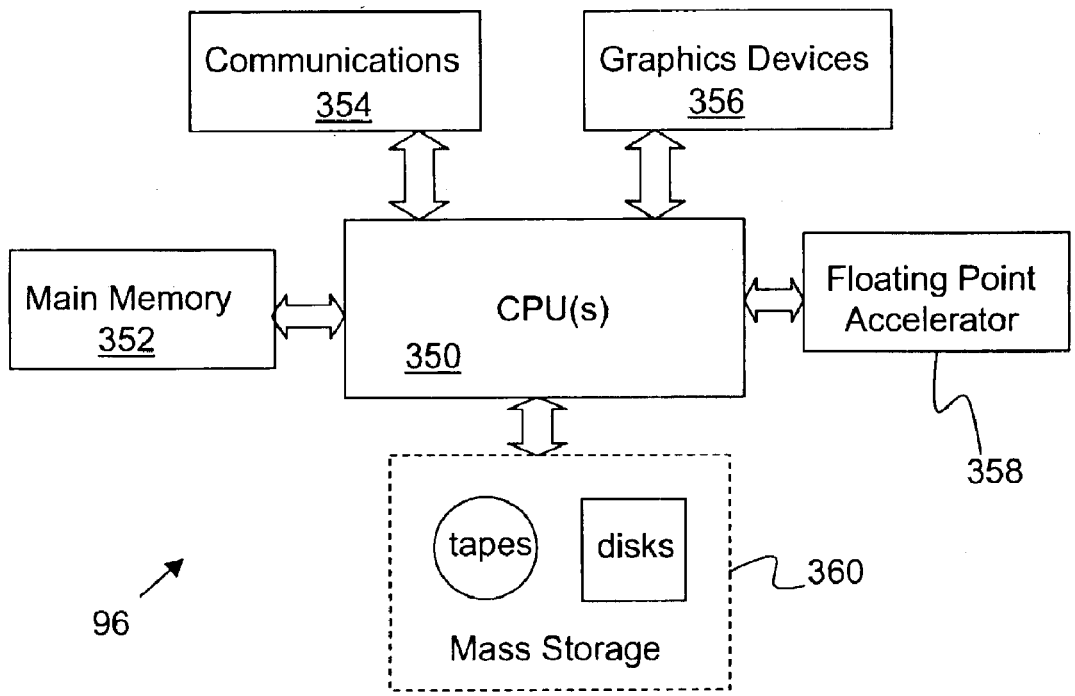
FIG. 11 shows further detail of a suitable processor, according to preferred embodiments of the invention.

FIG. 11 shows further detail of surface processor 96, according to preferred embodiments of the invention. Surface processor 96 preferably consists of one or more central processing units 350, main memory 352, communications or I/O modules 354, graphics devices 356, a floating point accelerator 358, and mass storage such as tapes and discs 360.

The override processor 97 is preferably connected to the equipment of the drilling rig via a rig controller which has integrated electronic control capability. One possible controller is a workstation of the type shown in GB-A-2341916. Another possible controller is the Varco V-ICIS™ system (for more information on this see http://www.varco.com/products/VDE/c5mdt/c5mdt/css/c5mdt_html). When an undesirable event is detected, command signals are sent from the override unit to the rig controller. The signals force the rig controller to control the rig equipment in such a way that the actions identified by the override unit are carried out.

Subsequent rig activity depends on the type of event that has been detected. For example, if the drilling process is tripping in or out and the override unit has merely prevented the drill string from exceeding the maximum tripping speed, control may be handed back directly to the rig controller for continuation of the overridden process. If, on the other hand, a potentially dangerous kick has been prevented, the override unit may suspend further rig processes so that a review of drilling operations can be performed.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references mentioned herein are incorporated by reference.

What is claimed is:

1. A method of automatically averting or mitigating undesirable drilling events during a drilling process, the method comprising:

detecting the state of the drilling rig performing the drilling process, acquiring surface and/or downhole measurement data, detecting one or more undesirable drilling events by correlating the acquired measurement data with the detected state, determining a drilling rig action which averts or mitigates a detected undesirable drilling event, and overriding the drilling process by commanding performance of the action.

2. A method according to claim 1, wherein the detection of the state of the drilling rig comprises the steps of:

receiving two or more independent input data channels, each input data channel representing a series of measurements made over time during the drilling process, and based on the two or more input data channels, detecting the most likely current state of the drilling rig from at least three possible rig states.

3. A method according to claim 2, wherein the two or more input channels include two or more of the following input channels: hookload, block position, torque, and stand pipe pressure.

4. A method according to claim 1, wherein the undesirable drilling events include a dangerous swab or surge pressure.

5. A method according to claim 1, wherein the undesirable drilling events include returning the bit to the well bottom too quickly.

6. A method according to claim 1, wherein the undesirable drilling events include downhole mud motor stall.

7. A method according to claim 1, wherein the undesirable drilling events include a washout.

8. A method according to claim 1, wherein the undesirable drilling events include bit wear.

9. A method according to claim 1, further comprising the step of acquiring earth model data, the acquired measurement data being further correlated with the earth model data in order to detect the undesirable drilling events.

10. A system for automatically averting or mitigating undesirable drilling events during a drilling process, the system comprising:

a detection system for detecting the state of the drilling rig performing the drilling process, an acquisition system for acquiring surface and/or downhole measurement data, a processor for (i) detecting one or more undesirable drilling events by correlating the acquired measurement data with the detected state, and (ii) determining a drilling rig action which averts or mitigates a detected undesirable drilling event, and a command issue device for overriding the drilling process by issuing a command requiring performance of the action.

\* \* \* \* \*